(12) United States Patent
Ichikawa et al.

(10) Patent No.: US 9,136,719 B2
(45) Date of Patent: Sep. 15, 2015

(54) VEHICULAR CHARGE CONTROL APPARATUS AND VEHICULAR CHARGE CONTROL SYSTEM

(75) Inventors: Junichi Ichikawa, Takahama (JP); Yoshio Koie, Handa (JP)

(73) Assignee: DENSO CORPORATION, Kariya (JP)

( * ) Notice: Subject to any disclaimer, the term of this patent is extended or adjusted under 35 U.S.C. 154(b) by 872 days.

(21) Appl. No.: 13/358,733

(22) Filed: Jan. 26, 2012

(65) Prior Publication Data
US 2012/0206099 A1 Aug. 16, 2012

(30) Foreign Application Priority Data
Feb. 10, 2011 (JP) ................................ 2011-027247

(51) Int. Cl.
*H02J 7/00* (2006.01)
*B60L 11/18* (2006.01)

(52) U.S. Cl.
CPC ........... *H02J 7/0036* (2013.01); *B60L 11/1838* (2013.01); *B60L 11/1816* (2013.01); *B60L 2230/40* (2013.01); *B60L 2250/16* (2013.01); *B60L 2250/22* (2013.01); *Y02T 10/7005* (2013.01); *Y02T 10/7011* (2013.01); *Y02T 90/14* (2013.01)

(58) Field of Classification Search
USPC ................................................. 320/104, 109
See application file for complete search history.

(56) References Cited

U.S. PATENT DOCUMENTS

| 2010/0045450 | A1* | 2/2010 | Suzuki et al. ................. 340/438 |
| 2010/0204859 | A1* | 8/2010 | Kamaga ......................... 701/22 |
| 2010/0228413 | A1 | 9/2010 | Fujitake |
| 2010/0295507 | A1 | 11/2010 | Ishii et al. |
| 2011/0022256 | A1* | 1/2011 | Asada et al. .................... 701/22 |

FOREIGN PATENT DOCUMENTS

| JP | 5-056504 | 3/1993 |
| JP | 9-182212 | 7/1997 |
| JP | 2010-277381 | 12/2010 |

OTHER PUBLICATIONS

Office Action issued Dec. 4, 2012 in corresponding Japanese Application No. 2011-027247 with English translation.
Office Action issued Feb. 19, 2013 in corresponding Japanese Application No. 2011-027247 with English translation.

* cited by examiner

*Primary Examiner* — Samuel Berhanu
(74) *Attorney, Agent, or Firm* — Harness, Dickey & Pierce, PLC

(57) ABSTRACT

A vehicular charge control apparatus in a vehicle controls a charge operation to the vehicle from an external power supply facility, by using a charge intention determination unit for determining whether a user of the vehicle has an intention to charge, a plug connection state determination unit for determining whether a charge plug is connected to the vehicle when the user's intention to charge is determined by the charge intention determination unit, and a notification execution unit for executing a predetermined notification process when loss of connection to the charge plug is determined by the plug connection state determination unit.

16 Claims, 10 Drawing Sheets

VEHICULAR CHARGE CONTROL APPARATUS AND VEHICULAR CHARGE CONTROL SYSTEM

CROSS REFERENCE TO RELATED APPLICATION

The present application is based on and claims the benefit of priority of Japanese Patent Application No. 2011-27247, filed on Feb. 10, 2011, the disclosure of which is incorporated herein by reference.

TECHNICAL FIELD

The present disclosure generally relates to a vehicular charge control apparatus that controls a charge operation of a vehicle from an external power source of the vehicle and a vehicular charge control system having such vehicular charge control apparatus.

BACKGROUND

In recent years, hybrid vehicles (e.g., a plug-in hybrid vehicle) and electric vehicles are becoming more common. As a result, a vehicular charge control apparatus for controlling a charge operation of such vehicles are needed.

Conventionally, the charge control apparatus may have a function to start charging the vehicle at a preset time, such as a charge reservation function. However, in order to charge the vehicle by way of the charge reservation function, a charge plug extending from an external power source needs to be adequately connected to the vehicle at a start time of the charging. Therefore, various technique for detecting an abnormality of a connection state of the plug (e.g., a charge plug being forgotten to be plugged in to a connector, a plug being pulled off from a connector, a plug falling off from a connector, or the like) before starting the charging are proposed. For example, Japanese Patent Application 2009-60728 (US Publication No. 2010-0204859) discloses an apparatus that is configured not to start the charge operation by canceling a preset charge start time, when it is detected that a charge cable is being pulled off from a charge connector based on a pull-off checking action.

SUMMARY

In view of the above and other problems, the present disclosure provides a vehicular charge control apparatus and a system having such apparatus, in which a pre-charging plug connection state is checked in an advantageous manner to detect whether an abnormality in a plug connection state that prevents an adequate charging of the vehicle exists.

The abnormality detection regarding the connection state of the plug is required only when the user of the vehicle has an intention to charge a battery of the vehicle. That is, when the user desires to store the electric power in the battery of the vehicle, the connection state of the charge plug should be checked, and thus, when the user does not have an intention to charge the battery, it is not necessary to detect the abnormality of the plug connection state.

In an aspect of the present invention, a charge intention determination unit of the vehicular charge control apparatus determines if the user of the vehicle has an intention to charge the vehicle, and a plug connection state determination unit determines whether a charge plug is connected to the vehicle when the charge intention determination unit determines that the user has an intention to charge. Further, a notification process execution unit executes a predetermined notification process when the plug connection state determination unit determines that the plug is not connected.

In such manner, the connection state of the plug is determined only when the user of the vehicle has an intention to charge. Then, as a result of such determination, if the plug is not connected despite the user's intention to charge, such condition (i.e., the plug not being adequately connected to the vehicle) is securely notified to the user. On the other hand, if the plug is not connected due to the lack of an intention of the user to charge the vehicle's battery, such condition (i.e., the plug not being connected to the vehicle) will not be notified to the user. In other words, the abnormality detection of the plug connection state is performed before the start of the charging according to the user's intention, that is, according to a determination of whether the user has or does not have an intention to charge, thereby more truly and accurately reflecting the user's intention to the determination of the plug connection state and to the notification of the abnormality of the plug connection state.

In addition to the above configuration, a getting-off determination unit determines whether the user has gotten off the vehicle, and a stop position determination unit determines that a stop position of the vehicle is a predetermined position, and an elapsed time determination unit determines whether an elapsed time after the stopping of the vehicle is greater than a predetermined time length. Further, the charge intention determination unit determines that the user has an intention to charge when all of following three conditions are fulfilled: (i) when the getting-off determination unit determines that the user has gotten off the vehicle; (ii) when the stop position determination unit determines that the stop position of the vehicle is the predetermined position; and (iii) when the elapsed time determination unit determines that the elapsed time after the stopping of the vehicle is greater than the predetermined time length. In such case, the above configuration may further include a confirmation screen display unit that displays a confirmation screen for confirming that the user has the intention to charge when the stop position determination unit determines that the stop position of the vehicle is the predetermined position.

In addition to the above configuration, the vehicular charge control apparatus may be configured in the following manner. That is, the plug connection state determination unit may repeatedly perform a determination process that determines whether the charge plug is connected to the vehicle when the getting-off determination unit determines that the user has gotten off the vehicle, and the notification process execution unit may repeatedly execute the notification process when the plug connection state determination unit determines that the charge plug is not connected.

In addition to the above configuration, the vehicular charge control apparatus may further include a charge start time setting unit that sets a time to start charge of the vehicle as a reserved charge start time. Further, the charge intention determination unit may determine that the user has an intention to charge when the charge start time setting unit sets the reserved charge start time.

In addition to the above configuration, the vehicular charge control apparatus may further include a charge start time setting unit that sets a time to start charge of the vehicle as a reserved charge start time. Further, the charge intention determination unit may determine that the user has an intention to charge when (i) the charge start time setting unit sets the reserved charge start time, and (ii) a current time is a predetermined time length before the reserved charge start time.

In addition to the above configuration, the vehicular charge control apparatus may further include a determination start time setting unit that sets a time to a determination process by the charge intention determination unit as a determination process start time. Further, the charge intention determination unit determines that the user has an intention to charge when the determination start time setting unit sets the determination process start time.

In addition to the above configuration, the vehicular charge control apparatus may further include a determination start time setting unit that sets a time to a determination process by the charge intention determination unit as a determination process start time. Further, the charge intention determination unit determines that the user has an intention to charge when (i) the determination start time setting unit sets the determination process start time, and (ii) a current time is the determination process start time.

The above described variations of the configuration of the vehicular charge control apparatus are intended to describe how the charge intention determination unit determines the user's intention to charge, in a practical manner.

A vehicular charge control system, having the above-described vehicular charge control apparatus that controls a charge operation of a vehicle from an external power source of the vehicle, uses a charge intention determination unit to determine whether the user of the vehicle has an intention to charge, and, upon determining the charge intention by the charge intention determination unit, uses a plug connection state determination unit to determine whether a charge plug is connected to the vehicle, and, upon determining that the charge plug is not connected to the vehicle, uses a connection abnormality signal transmission unit to transmit a connection abnormality signal to an information center. On the other hand, the information center that is communicable with the vehicular charge control apparatus receives, by using a connection abnormality signal reception unit, a connection abnormality signal transmitted by a connection abnormality signal transmission unit, and, upon receiving such connection abnormality signal, uses a notification process execution unit to perform a predetermined notification process.

According to the above-described vehicular charge control system, the plug connection state abnormality detection is performed prior to the start of the charging, according to the user's intention to charge or not to charge, thereby more truly reflecting the user's intention to the detection of the plug connection state and to the notification of the abnormality of the plug connection state.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

The first embodiment of the present disclosure is explained as follows while with reference to FIGS. 1 to 4.

Figure 1:
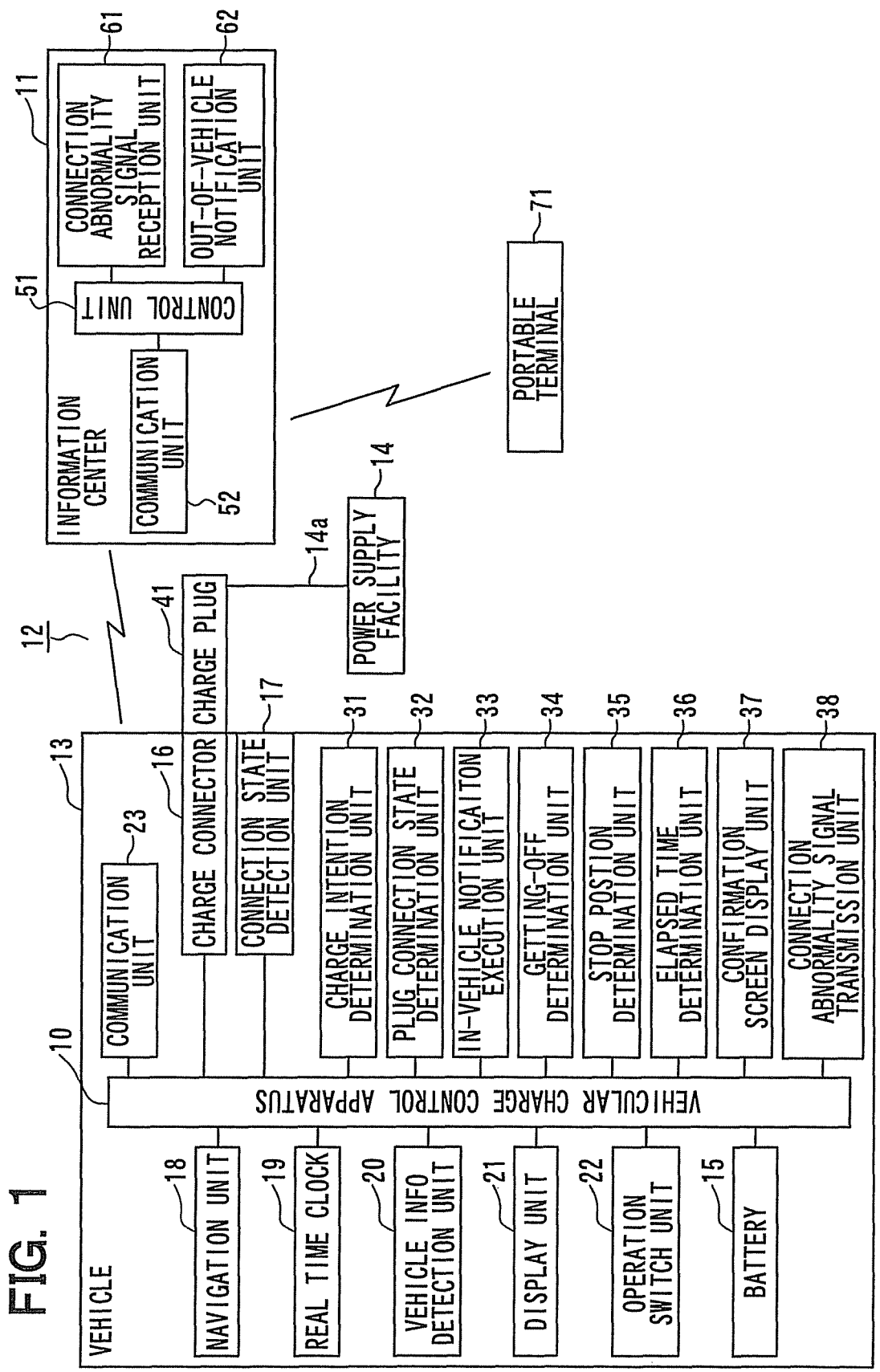
FIG. 1 is a block diagram of a vehicular charge control system having a vehicular charge control apparatus and a information center in a first embodiment of the present disclosure.

FIG. 1 is a block diagram of a vehicular charge control system 12 which includes a vehicular charge control apparatus 10 and an information center 11.

First, the configuration of the vehicular charge control apparatus 10 is explained.

The vehicular charge control apparatus 10 is equipped in a vehicle 13. The vehicle 13 may be a plug-in hybrid vehicle or a battery vehicle, or the like. The vehicle charge control apparatus 10 may be a CPU, a ROM, and microcomputer having the RAM. The vehicular charge control apparatus 10 controls a charge operation of a battery 15 that is equipped in the vehicle 13, and the charge operation charges the battery 15 with power from a power supply facility 14 (may be referred to as a power supply in claims) that is external to the vehicle 13. The battery 15 may be an NiMH secondary battery, or a lithium ion secondary battery, or the like.

The vehicular charge control apparatus 10 is coupled to a charge connector 16, a connection state detection unit 17, a navigation unit 18, a real time clock (RTC) 19, a vehicle information detection unit 20, a display unit 21, an operation switch unit 22, and a communication unit 23.

In addition, the vehicular charge control apparatus 10 realizes the following units as software processes by executing a program: a charge intention determination unit 31, a plug connection state determination unit 32, an in-vehicle notification execution unit 33, a getting-off determination unit 34, a stop position determination unit 35, an elapsed time determination unit 36, a confirmation screen display unit 37, a connection abnormality signal transmission unit 38.

The vehicle 13 includes the charge connector 16 on a side of the body of the vehicle 13. A power supply facility 14 is equipped with a charge cable 14a that has a charge plug 41. The charge connector 16 is detachably connected to the charge plug 41. The power supply facility 14 may be a public charge facility in a charge station or a parking area, or may be a private charge facility in a house.

The connection state detection unit 17 may be, for example, configured as a mechanical switch used in the charge connector 16. This mechanical switch is a physical switch that is turned on when the charge plug 41 is adequately connected to the charge connector 16. The vehicular charge control apparatus 10 determines that the charge plug 41 is adequately connected to the charge connector 16 when the mechanical switch is turned on, and is not adequately connected to the charge connector 16, when the mechanical switch is not turned on. In such case, "the charge plug 41 is adequately connected to the charge connector 16" means that the charge plug 41 is, without being forgotten to be plugged in, without being pulled off, or without falling off, connected to the charge connector 16 so that the vehicular charge control apparatus 10 can execute a charge operation to charge the battery 15.

In addition, the connection state detection unit 17 may be configured to be realized by a software process executed by the vehicular charge control apparatus 10, instead of a physical device such as a mechanical switch. In other words, the vehicular charge control apparatus 10 may execute the charge operation to charge the battery 15 only for a short time (e.g., a few seconds), and, if a supply of electricity from the power supply facility 14 to the battery 15 is confirmed, it may be determined that the charge plug 41 is adequately connected to the charge connector 16, and, if the charge operation is not confirmed, it may be determined that the charge plug 41 is not adequately connected to the charge controller 16.

The navigation unit 18 performs a route guidance of the vehicle 13. The navigation unit 18 may include a Global Positioning System (GPS) receiver and a map data input unit to input memorized map data in a map data storage. The GPS receiver receives an electric wave that is transmitted by a GPS satellite for the measurement of the current position of the vehicle.

The RTC 19 is, for example, a time measurement unit for acquiring time information such as a date, a time, an elapsed time, and the like. The RTC 19 counts the number of clock pulses output from an oscillator, and generates a unit time signal for displaying a unit time when the counted number of pulses reaches a standard number. Then, the RTC 19 generates a terminal time based on the generated unit time signal.

The vehicle information detection unit 20 includes various devices (for example, an engine control unit, a brake control unit, a transmission control unit, an in-vehicle camera, and the like); various sensors (for example, an acceleration sensor, a speed sensor, an accelerator sensor, a sitting sensor and the like); various switches (for example, an accessory switch, an ignition switch, a door switch, a door lock switch and the like), together with other devices. The vehicle information detection unit 20 inputs various information detected by these devices, sensors, and switches into the vehicular charge control apparatus 10 as vehicle information.

The display unit 21 may include a color display device such as a liquid crystal display or an organic electroluminescence display. The display unit 21 may display various screens such as a charge control screen, an operation explanation screen, a setting input screen, and the like. The display unit 21 may be a display unit equipped in the navigation unit 18, or may be a display unit of an equipment other than the navigation unit 18.

The operation switch unit 22 includes a plurality of switches, such as mechanical switches closely positioned around a screen of the display unit 21, or touch panel switches on the screen of the display unit 21. The user may perform various setting operations such as a setting of a start time of reserved charging, by using switches of the operation switch unit 22.

The communication unit 23 performs, through a wireless communication channel, data communication with the information center 11. That is, the communication unit 23 has a data transmission function and a data reception function for transmitting and receiving various data.

The charge intention determination unit 31 determines whether a user of the vehicle 13 has an intention to charge the battery 15. A determination process performed by the charge intention determination unit 31 is described in more details in the following.

The plug connection state determination unit 32 determines whether the charge plug 41 is adequately connected to the charge connector 16 of the vehicle 13 when the charge intention determination unit 31 determines that the user has an intention to charge.

The in-vehicle notification execution unit 33 performs a predetermined notification process (i.e., an in-vehicle notification process) when the plug connection state determination unit 32 determines that the charge plug 41 is not adequately connected to the charge connector 16. Practical examples of the in-vehicle notification process are described later in detail.

The getting-off determination unit 34 determines whether the user has gotten off the vehicle 13. Such determination is performed based on the information acquired from the vehicle information detection unit 20. For example, the getting-off determination unit 34 determines that the user has gotten off the vehicle 13 when a switch in the vehicle 13, such as an accessory switch or an ignition switch is switched from an ON state to an OFF state after the vehicle 13 has stopped, when a sitting sensor in the vehicle 13 switches from an ON state to an OFF state after the vehicle 13 has stopped, when a door switch of the vehicle 13 switches from an ON state to an OFF state after the vehicle 13 has stopped, or when a door lock switch of the vehicle 13 switches from an ON state to an OFF state after the vehicle 13 has stopped. Further, the getting-off determination unit 34 may be configured to determine that the user has gotten off the vehicle 13 when a getting-off behavior of the user from the vehicle 13 is detected based on an image analysis of an image that is captured by a camera in the vehicle 13, or when the absence of the user in the vehicle 13 is detected based on such analysis.

The stop position determination unit 35 determines whether the vehicle 13 has stopped at a "predetermined position" based on position information of the vehicle 13 provided from the navigation unit 18. In this case, the "predetermined position" is a position where the power supply facility 14 is installed, and the position where the power supply facility 14 is installed is pre-stored in the database of the navigation unit 18 or in the database of the vehicular charge control apparatus 10. The memorization of the predetermined position may be performed by the user through the operation switch unit 22, or may be performed automatically by the vehicular charge control apparatus 10 through the execution of software.

The elapsed time determination unit 36 determines whether a predetermined period of time has elapsed since the vehicle 13 came to a stop. In this case, the "predetermined time" may preferably be a couple of minutes (i.e., two to three minutes) that is usually required for the user to connect the charge plug 41 to the charge connector 16 after the vehicle 13 has stopped. Setting of the predetermined time may be performed by the user through the operation switch unit 22, or may be performed automatically by the vehicular charge control apparatus 10 through the execution of a software.

In the present embodiment, the charge intention determination unit 31 determines whether the user has an intention to charge the vehicle 13 based on the outputs of the getting-off determination unit 34, the stop position determination unit 35, and/or the elapsed time determination unit 36.

Figure 2:
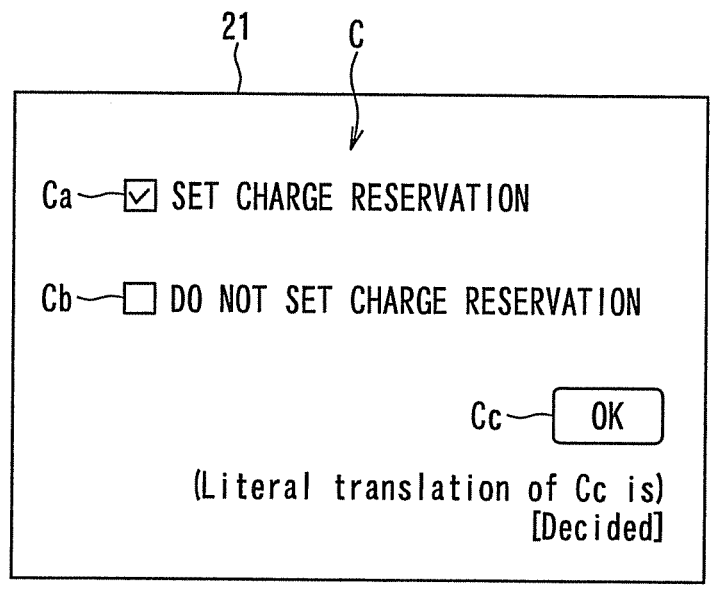
FIG. 2 is an illustration of a confirmation screen.

When it is determined by the stop position determination unit 35 that the vehicle 13 has stopped at a predetermined position, the confirmation screen display unit 37 displays, on the display unit 21, a confirmation screen C to prompt the user to confirm an intention to charge. The confirmation screen C has, as shown in FIG. 2, a check box Ca for indicating that the user has an intention to charge and a check box Cb for indicating that the user has no intention to charge as well as an "OK" button Cc, and the user can check one of two check boxes and then press the OK button to confirm and input his/her intention to charge or no intention to charge to the vehicular charge control apparatus 10.

The connection abnormality signal transmission unit 38 generates a connection abnormality signal when the plug connection state determination unit 32 determines that the charge plug 41 is not adequately connected to the charge connector 16, and transmits the connection abnormality signal to the information center 11 through the communication unit 23.

The configuration of the information center 11 is explained in the following. The information center 11 includes a control unit 51 and a communication unit 52. The control unit 51 includes a microcomputer which has, as main components, a CPU, a ROM, and a RAM (not illustrated). The information center 11 realizes, by the execution of software in the CPU of the control unit 51, a connection abnormality signal reception unit 61 and an out-of-vehicle notification execution unit 62.

The communication unit 52 performs, for example, through wireless communication channel, data communication between the vehicular charge control apparatuses 10 on each of the vehicles 13. The communication unit 52 has a transmission function and a reception function of various data. Further, the communication unit 52 is configured to perform data communication with a portable terminal 71 that is owned by a user through, for example, wireless communication channel.

The connection abnormality signal reception unit 61 receives a connection abnormality signal which is transmitted by the connection abnormality signal transmission unit 38 of the vehicular charge control apparatus 10 through the communication unit 52.

When the connection abnormality signal reception unit 61 receives the connection abnormality signal, the out-of-vehicle notification execution unit 62 performs a predetermined notification process (i.e., an out-of-vehicle notification process). Details of the out-of-vehicle notification process are described later.

Figure 3:
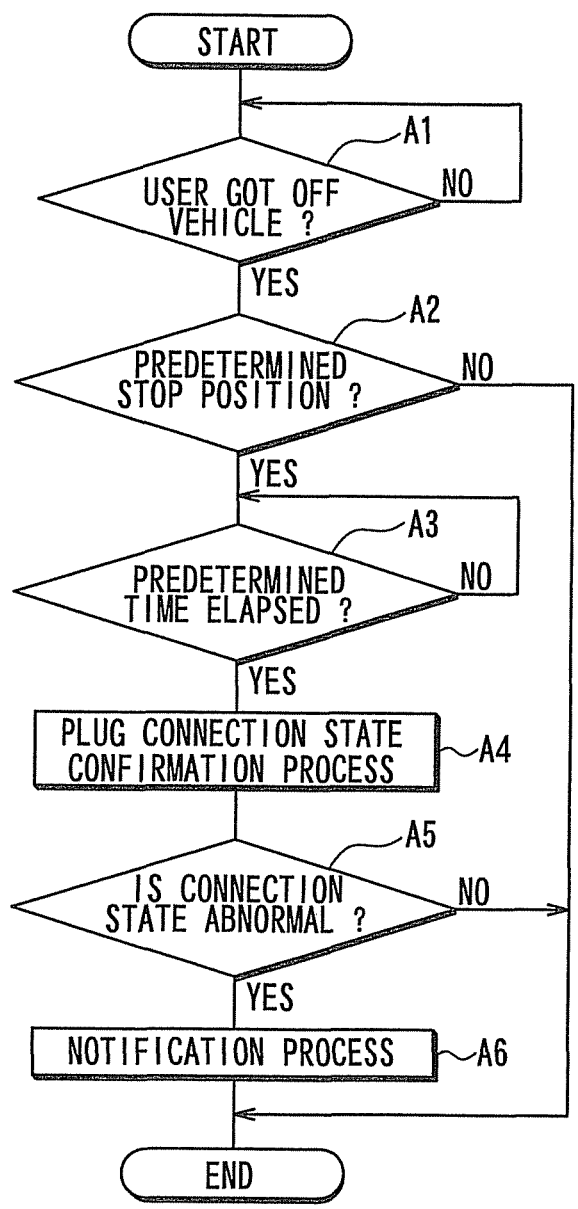
FIG. 3 is a flowchart of a plug connection state detection and notification.

The operation of the vehicular charge control system 12 configured in the above-described manner (i.e., a process for detection and notification of a plug connection state) is explained in the following with reference to a flowchart shown in FIG. 3. In addition, a process for detection and notification of the plug connection state is performed before the start of the charge operation to charge the battery 15 at the power supply facility 14.

The vehicular charge control apparatus 10 determines whether the user has gotten off the vehicle 13 (step A1). When the vehicular charge control apparatus 10 determines that the user has gotten off the vehicle 13 (step A1:YES), then, the vehicular charge control apparatus 10 determines whether the vehicle 13 has stopped at a predetermined position (step A2). When the vehicular charge control apparatus 10 determines that the stop position of the vehicle 13 is not at a predetermined position (step A2:NO), the process for detection and notification of a plug connection state is finished. When the vehicular charge control apparatus 10 determines that the vehicle 13 is stopped at a predetermined position (step A2:YES), the vehicular charge control apparatus 10 determines whether a predetermined period of time has elapsed after the vehicle 13 has come to a stop at the predetermined position (step A3).

The vehicular charge control apparatus 10 waits until the predetermined period of time elapses (step A3:NO). When the predetermined period of time elapses (step A3:YES), the vehicular charge control apparatus 10 determines that the user has an intention to charge, and a confirmation process for confirming the plug connection state (step A4) is performed. In other words, when the user gets off the vehicle 13 (step A1:YES), and when the vehicle stops at the predetermined position (step A2:YES), and when the predetermined period of time elapses after the stopping of the vehicle 13 at the predetermined position (step A3:YES), the vehicular charge control apparatus 10 in the present embodiment determines that the user has an intention to charge.

In the confirmation process for confirming the plug connection state (step A4), the vehicular charge control apparatus 10 determines whether the charge plug 41 is adequately connected to the charge connector 16 of the vehicle 13 based on a detection result by the connection state detection unit 17.

Then, the vehicular charge control apparatus 10 determines whether a connection abnormality (i.e., the charge plug 41 is either forgotten to be plugged in, being pulled off, falling off, or the like) is detected by the confirmation process of the plug connection state (step A5). When a connection abnormality of the plug connection state is not detected (step A5:NO), the vehicular charge control apparatus 10 finishes the process for detection and notification of the plug connection state. On the other hand, when a connection abnormality of the plug connection state is detected (step A5:YES), the vehicular charge control apparatus 10 performs a notification process (step A6).

The notification process includes, in this case, an in-vehicle notification process and an out-of-vehicle notification process. By performing the in-vehicle notification process, the vehicular charge control apparatus 10 displays a notification screen (not illustrated) on the display unit 21 in the vehicle 13. On the other hand, by performing the out-of-vehicle notification process, the vehicular charge control apparatus 10 transmits a connection abnormality signal to the information center 11. The information center 11, which has received a connection abnormality signal, transmits required data (i.e., data for displaying a notification screen) to the portable terminal 71 of the user to display a notification screen. The portable terminal 71, which has received the data of the notification screen, displays the notification screen based on the data for displaying the notification screen on a display unit installed in the portable terminal 71 (not illustrated). In such case, the notification screen displayed by the in-vehicle notification process and the notification screen displayed by the out-of-vehicle notification process respectively display information indicative of "the charge plug 41 not adequately connected to the charge connector 16" as, for example, text information.

In addition, when it is determined by the stop position determination unit 35 that the vehicle 13 has stopped at the predetermined position (step A2:YES), the vehicular charge control apparatus 10 may preferably be configured to display on the display unit 21 the confirmation screen C (cf. FIG. 2) to confirm whether the user has or does not have an intention to charge.

Figure 4:
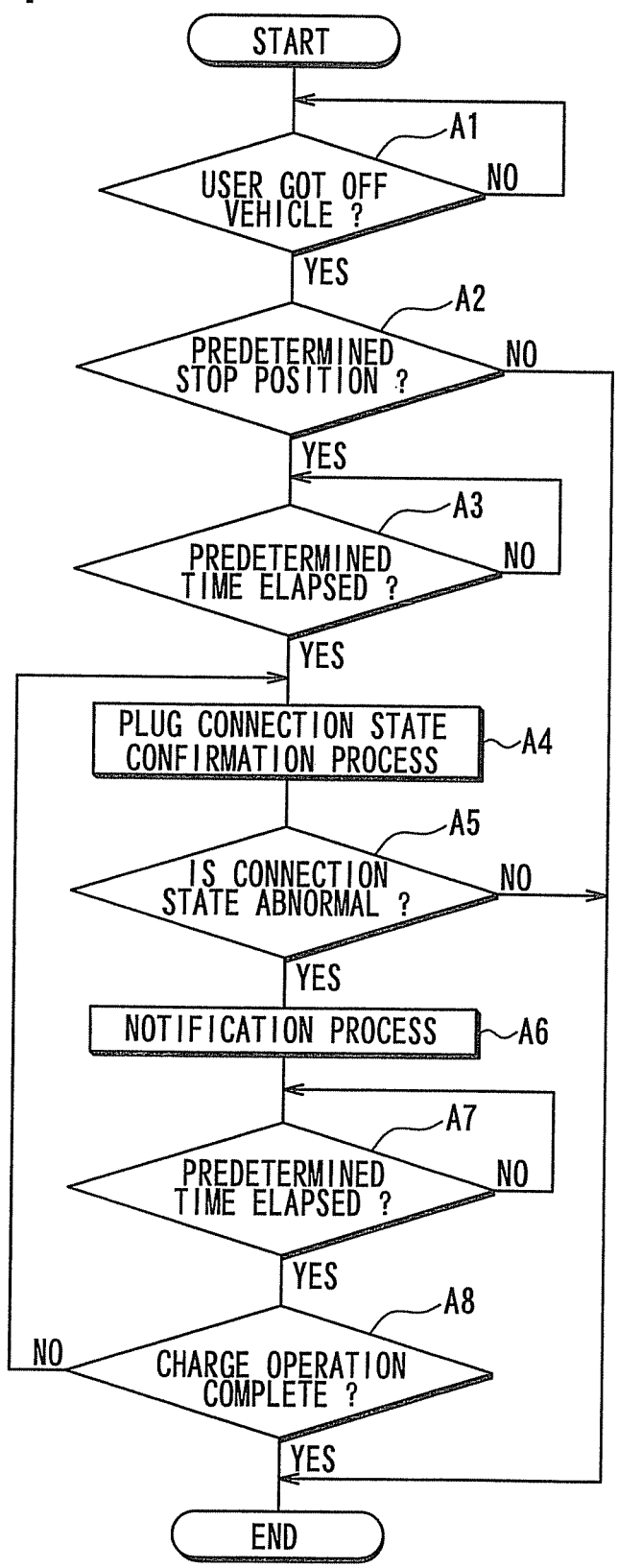
FIG. 4 is a modification of the flowchart shown in FIG. 3.

Further, when it is determined that the user has gotten off the vehicle 13 by the getting-off determination unit 34 (step A1:YES), the vehicular charge control apparatus 10 may repeatedly perform the confirmation process for confirming the plug connection state (step A4) by the plug connection state determination unit 32, and may repeatedly perform the notification process (step A6) by the in-vehicle notification execution unit 33 and/or the out-of-vehicle notification execution unit 62 based on a determination result by the plug connection state determination unit 32 (step A5). With reference to FIG. 4, which is similar to the flow chart of FIG. 3, subsequent to the notification process in step A6, the vehicular charge control apparatus 10 determines whether a predetermined period of time has elapsed (step A7). In this case, "a predetermined period of time" in step A7 is defined as a longer time, e.g., 10 minutes to 1 hour, than a predetermined period of time in step A3, which is, for example, a length of time that is usually required for the user to connect the charge plug 41 to the charge connector 16 after the stop of the vehicle 13, that is, 2 to 3 minutes.

The vehicular charge control apparatus 10 waits until the predetermined period of time after the completion of the notification process has elapsed (step A7:NO). When the predetermined period of time after the completion of the notification process has elapsed (step A7:YES), the vehicular charge control apparatus 10 determines whether the charge operation is complete (step A8). When the charge operation is complete (step A8:YES), the vehicular charge control apparatus 10 finishes the process for detection and notification of the plug connection state. When the charge operation is not complete (step A8:NO), the vehicular charge control apparatus 10 returns the process to step A4 (i.e., the confirmation process for confirming the plug connection state). In such manner, the vehicular charge control apparatus 10 repeatedly performs plug connection determination (step A4) by the plug connection state determination unit 32 at a predetermined time interval of 10 minutes to 1 hour. Based on FIG. 4, when the user gets off the vehicle 13 (step A1:YES), and when the vehicle stops at the predetermined position (step A2:YES), and when a predetermine period of time (e.g. 2-3 minutes) after the vehicle 13 stopped at the predetermined position elapses (step A3:YES) (i.e., when the user is determined that he/she has an intention to charge), vehicular charge control apparatus 10 repeatedly performs the notification process (step A6) by the in-vehicle notification execution unit 33 and/or by the out-of-vehicle notification execution unit 62 at a predetermined time interval of 10 minutes to 1 hour, according to a plug connection determination (step A4) by the plug connection state determination unit 32.

According to the present embodiment, the determination of the connection state of the charge plug 41 is performed when the user of the vehicle 13 is determined to have an intention to charge. As a result of such determination, if the charge plug 41 is not adequately connected to the charge connector 16 of the vehicle 13 despite the user's intention to charge, such a plug connection state (i.e., the charge plug 41 being not connected to the charge connector 16 of the vehicle 13) is securely notified to the user. On the other hand, if the charge plug 41 is not connected to the charge connector 16 of the vehicle 13 due to the lack of the user's intention to charge, such a plug connection state (i.e., the charge plug 41 being not connected to the charge connector 16 of the vehicle 13) will not be notified to the user. In other words, according to the user's intention an abnormality detection of a connection state of the charge plug 41 is performed before starting the charge. Therefore, the user's intention is suitably reflected to a determination of whether to perform a connection state determination of the charge plug 41 and to a determination of whether to perform a notification of abnormality of the plug connection state.

Second Embodiment

Figure 5:
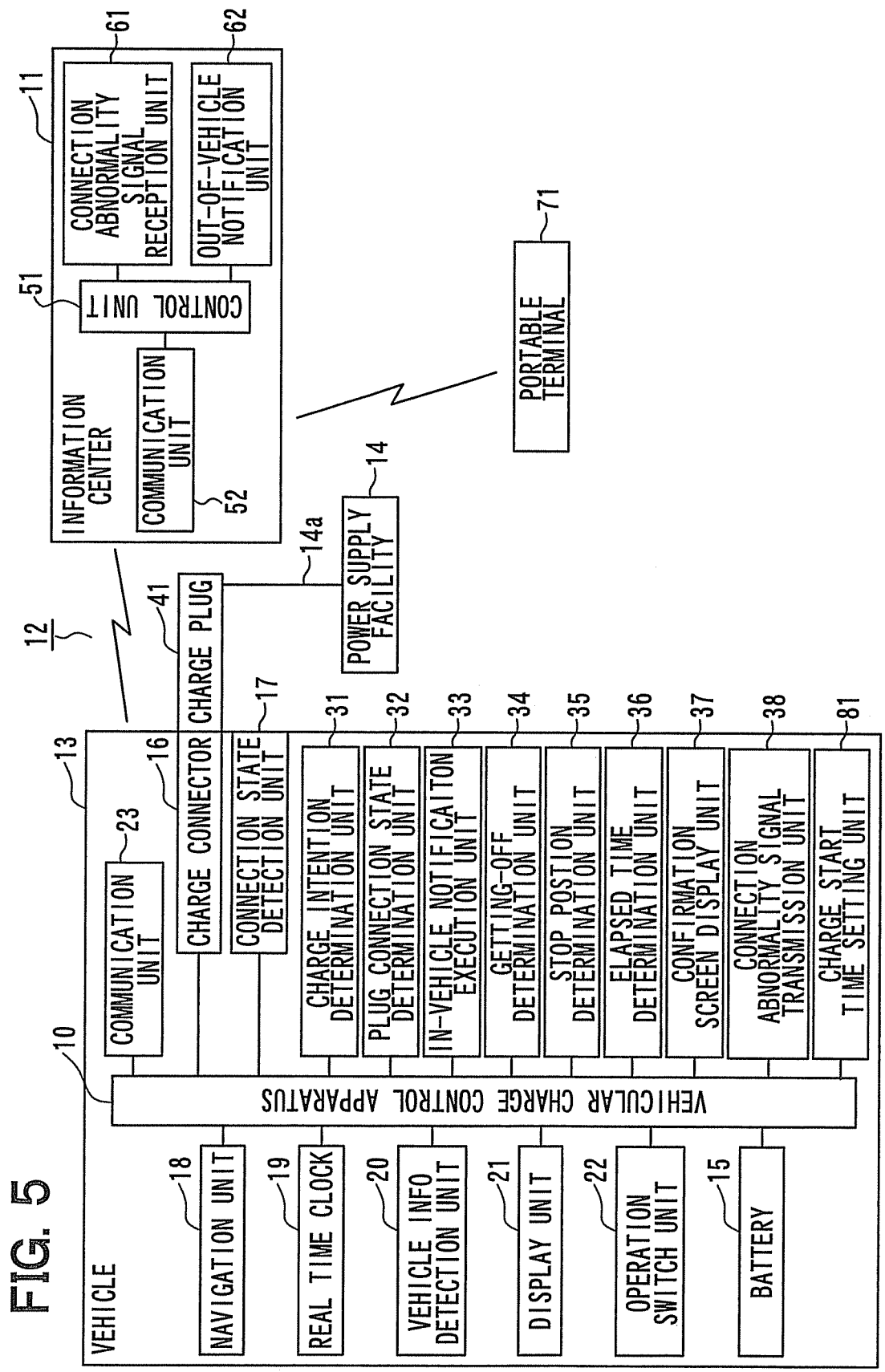
FIG. 5 is a block diagram of the system in a second embodiment, which corresponds to FIG. 1 in the first embodiment.
Figure 6:
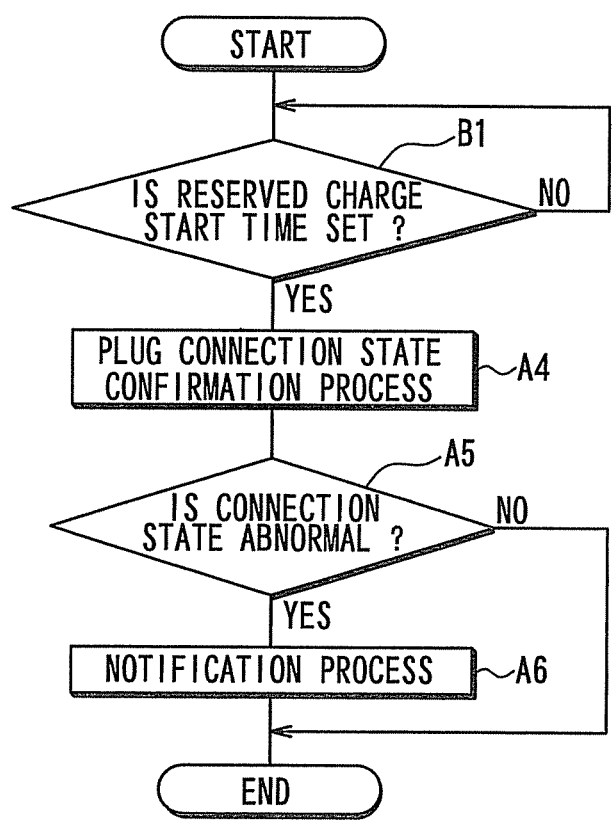
FIG. 6 is a flowchart of a plug connection state detection and notification in the second embodiment.

The second embodiment of the present disclosure is explained with reference to FIGS. 5 to 7. In the present embodiment, the configuration of the vehicular charge control apparatus 10 as well as the content of the determination process performed by the charge intention determination unit 31 are different. The following description is focused to explain such difference from the previous embodiment.

The vehicular charge control apparatus 10 includes a charge start time setting unit 81 that can be realized as a software executed by a control program in the CPU. The charge start time setting unit 81 displays a charge reservation setting screen (not illustrated) on the display unit 21. The charge reservation setting screen at least includes numeric keys to input time, a time display column to display time, and an OK button to set an inputted time as a reserved charge start time. The reserved charge start time is the time that the user would like to start the charge operation to the battery 15 at the power supply facility 14, and is configured to set the reserved charge start time according to the inputted time from the charge reservation setting screen.

The operation of the vehicular charge control system 12 of the second embodiment is described with reference to FIG. 6.

The vehicular charge control apparatus 10 determines whether the reserved charge start time has been set (step B1). When the reserved charge start time has been set (step B1:YES), the vehicular charge control apparatus 10 determines that the user has an intention to charge, and starts to perform the process of step A4 and after, which are equivalent to the steps described of the first embodiment.

In addition, when it is determined that the user has an intention to charge (step B1:YES), the vehicular charge control apparatus 10 in the present embodiment may also be configured to repeatedly perform the plug connection determination (step A4) by the plug connection state determination unit 32 at a predetermined period of time, such as 10 minutes to 1 hour, and may be configured to repeatedly perform the notification process by the in-vehicle notification execution unit 33 and/or by the out-of-vehicle notification execution unit 62 at a predetermined period of time, such as 10 minutes to 1 hour, according to a determination result by the plug connection state determination unit 32.

Figure 7:
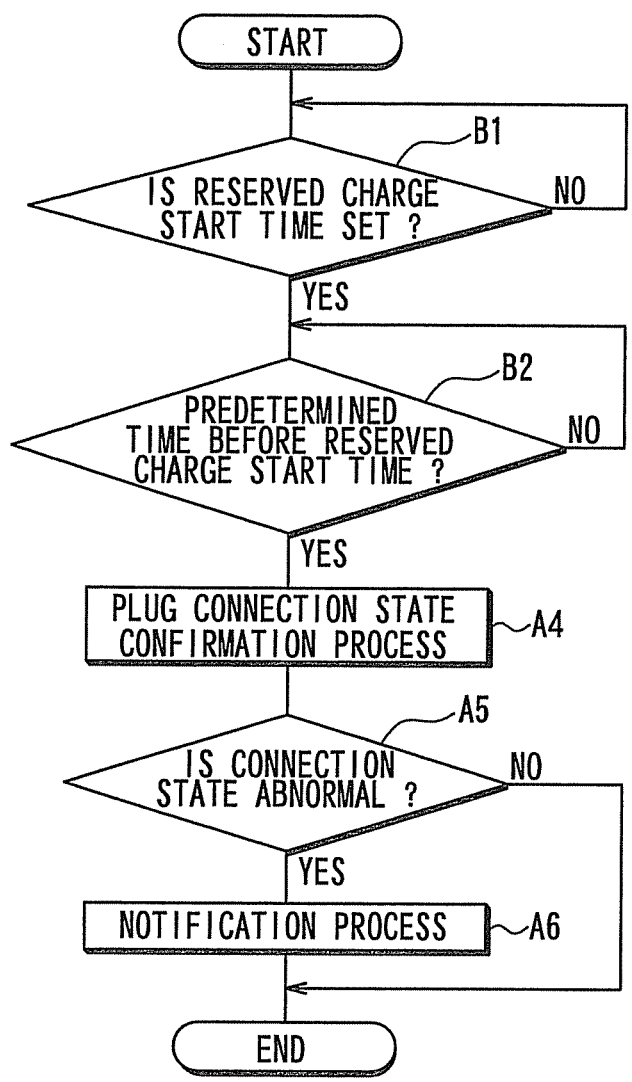
FIG. 7 is a modification of the flowchart in FIG. 6.

In addition, with reference to FIG. 7, when the reserved charge start time is set by the charge start time setting unit 81 (step B1:YES), the vehicular charge control apparatus 10 waits for a predetermined period of time before the reserved charge start time to determine that the user has an intention to charge. By way of example, the vehicular charge control apparatus 10 may set the predetermined period of time to 5 minutes, such that the user's intention to charge is not determined till 5 minutes before the reserved charge start time has elapsed. Once, the predetermined period of time before the reserved charge start time has elapsed (B2:YES), the vehicular charge control apparatus 10 performs the process of step A4 and after.

According to the present embodiment described above, the detection of the abnormality of the connection state of the charge plug 41 is performed according to whether the user has an intention to charge or not, thereby more suitably reflecting the user's intention to perform an abnormality detection of the connection state of the charge plug 41, and to perform a notification that the plug connection state is abnormal. Additionally, according to the second embodiment, the user's intention to perform the charge is determined based on the reserved charge start time.

Third Embodiment

Figure 8:
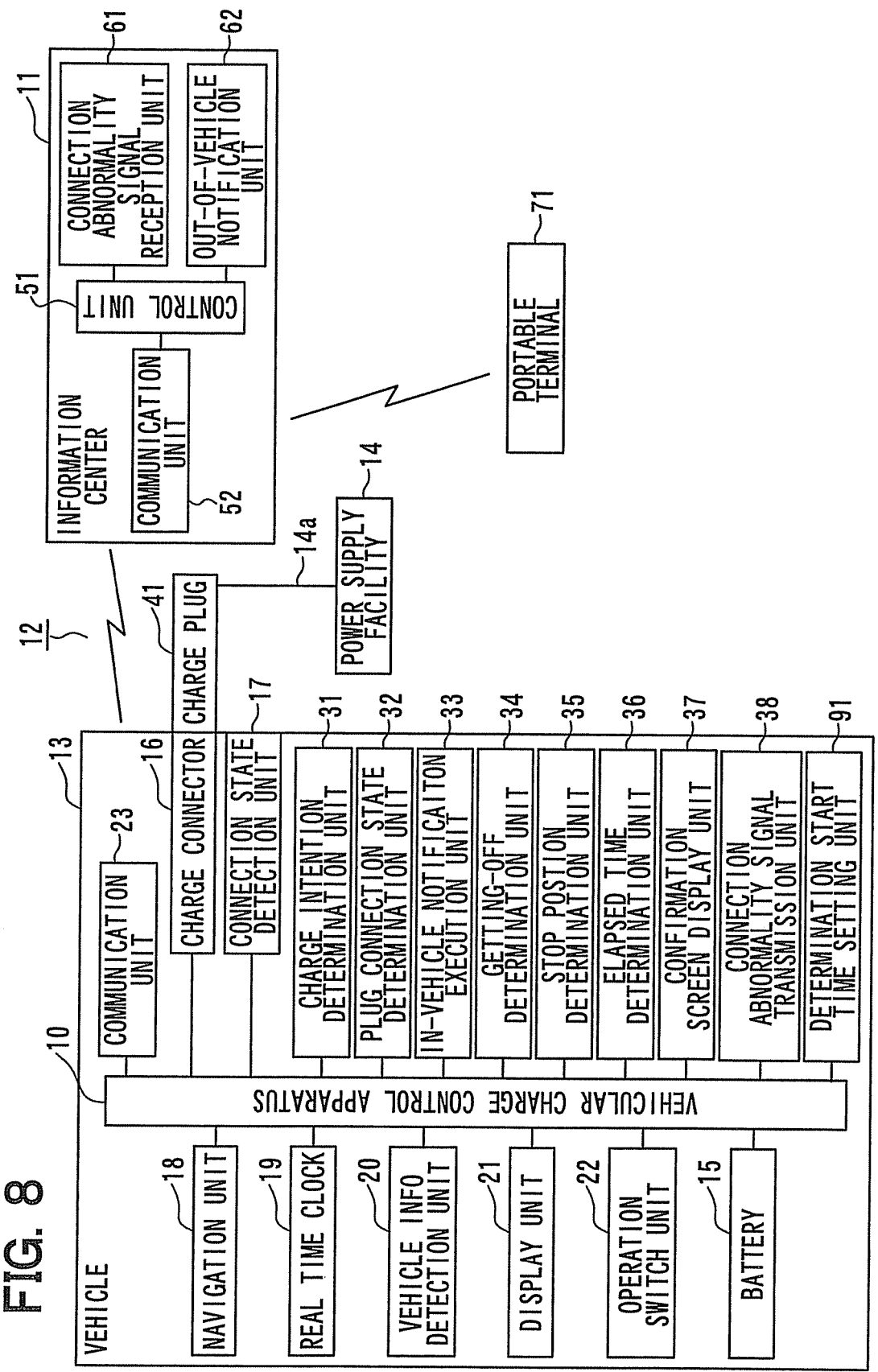
FIG. 8 is a block diagram of the system in a third embodiment, which corresponds to FIG. 1 in the first embodiment.
Figure 9:
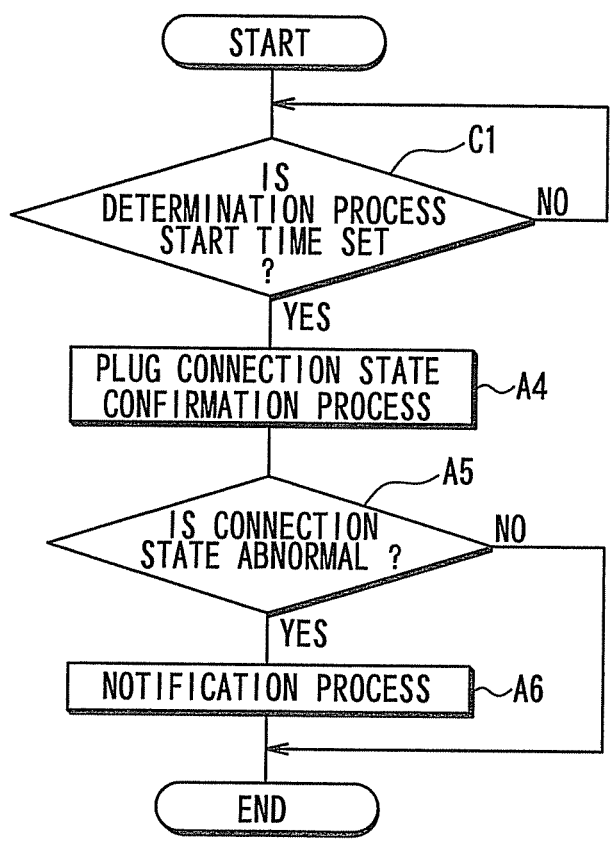
FIG. 9 is a flowchart of a plug connection state detection and notification in the third embodiment.

The third embodiment of the present disclosure is explained with reference to FIGS. 8 to 10. The present embodiment is different from the above-mentioned embodiments in the configuration of the vehicular charge control apparatus 10 and in the content of the determination process by the charge intention determination unit 31. The following description is focused to explain such difference.

The vehicular charge control apparatus 10 includes a determination start time setting unit 91 that may be implemented by executing a control program in the CPU. The determination start time setting unit 91 displays a determination process setting screen (not illustrated) on the display unit 21. The determination process setting screen at least includes numeric keys to input time, a time display column to display time, and an OK button to set an inputted time as a determination process start time. The determination process start time is the time that the determination process by the charge intention determination unit 31 starts, and is configured to set the determination process start time according to the inputted time from the determination process setting screen.

The operation of the vehicular charge control system 12 in the present embodiment is explained in the following with reference to a flowchart shown in FIG. 9.

The vehicular charge control apparatus 10 determines whether the determination process start time has been set (step C1). If the determination process start time has been set (step C1:YES), the vehicular charge control apparatus 10 determines that the user has an intention to charge, and starts to perform the process of step A4 and after, which are equivalent to the steps of the first embodiment.

In addition, when it is determined that the user has an intention to charge (step C1:YES), the vehicular charge control apparatus 10 in the present embodiment may also be configured to repeatedly perform the determination process (step A4) by the plug connection state determination unit 32 at a predetermined period of time, such as 10 minutes to 1 hour, and may be configured to repeatedly perform the notification process (step A6) by the in-vehicle notification execution unit 33 and/or by the out-of-vehicle notification execution unit 62 at a predetermined period of time, such as 10 minutes to 1 hour, according to a determination result by the plug connection state determination unit 32.

Figure 10:
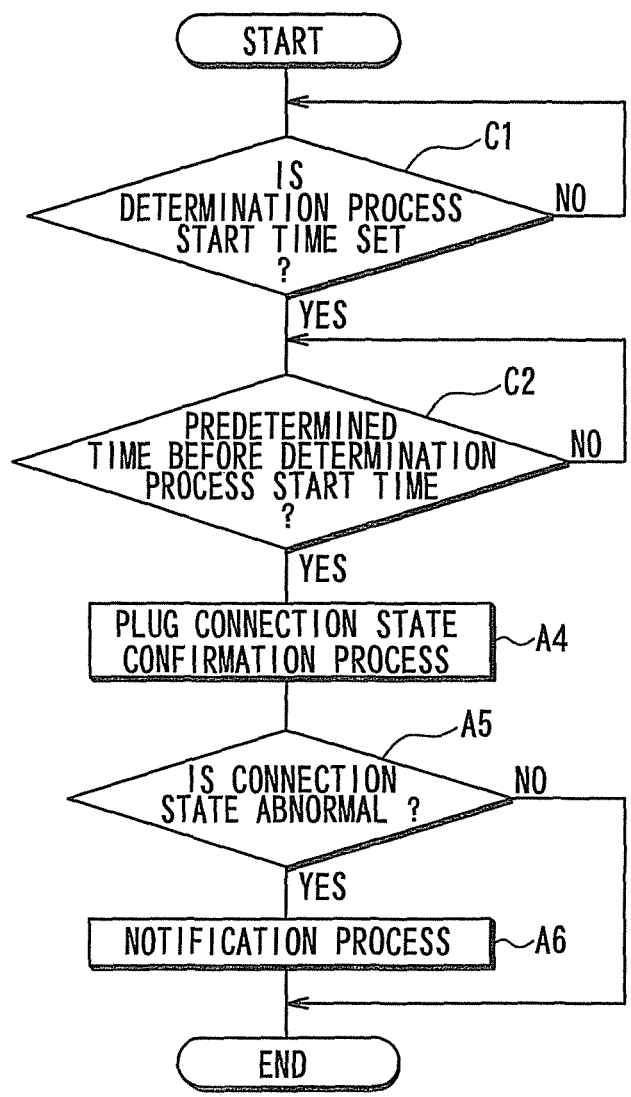
FIG. 10 is a modification of the flowchart in FIG. 9.

Further, as shown in FIG. 10, when the determination process start time is set by the determination start time setting unit 91 (step C1:YES), the vehicular charge control apparatus 10 may wait for a predetermined period of time before the determination process start time to determine that the user has an intention to charge. By way of example, the vehicular charge control apparatus 10 may set the predetermined period of time to 5 minutes, such that the user's intention to charge is not determined till the 5 minutes before the determination process start time has elapsed. Once, the predetermined period of time before the determination process start time has elapsed (C2:YES), the vehicular charge control apparatus 10 performs the process of step A4 and after.

According to the present embodiment described above, the detection of the abnormality of the connection state of the charge plug 41 is performed according to a determination of whether the user has an intention to charge or not, thereby more suitably reflecting the user's intention to perform a determination of the connection state of the charge plug 41, and to perform a notification that the plug connection state is abnormal. Additionally, according to the third embodiment, the user's intention to perform the charge is determined based on the determination process start time.

Other Embodiments

Although the present disclosure has been fully described in connection with preferred embodiment thereof with reference to the accompanying drawings, it is to be noted that various changes and modifications will become apparent to those skilled in the art.

For example, the in-vehicle notification process and the out-of-vehicle notification process may be performed by voice or by a warning sound from a speaker or a buzzer.

The connection abnormality signal reception unit 61 and the out-of-vehicle notification execution unit 62 may be disposed in the portable terminal 71 instead of disposing those units in the information center 11, and the connection abnormality signal transmission unit 38 may transmit the connection abnormality signal to the portable terminal 71. In other words, the information center 11 may be omitted.

Such changes, modifications, and summarized schemes are to be understood as being within the scope of the present disclosure as defined by appended claims.

What is claimed is:

1. A vehicular charge control apparatus for controlling a charge operation of a vehicle from an external power source of the vehicle, the apparatus comprising:
   a charge intention determination unit that determines whether a user of the vehicle has an intention to charge;
   a plug connection state determination unit that determines whether a charge plug is connected to the vehicle when the charge intention determination unit determines that the user has an intention to charge;
   a notification process execution unit that executes a predetermined notification process when the plug connection state determination unit determines that the plug is not connected;
   a getting-off determination unit that determines whether the user has gotten off the vehicle;
   a stop position determination unit that determines that a stop position of the vehicle is a predetermined position;
   an elapsed time determination unit that determines whether an elapsed time after the stopping of the vehicle is greater than a predetermined time length; and
   a connection abnormality signal transmission unit that is communicably coupled with an information center and transmits a connection abnormality signal to the information center when the plug connection state determination unit determines that the plug is not connected, wherein
   the charge intention determination unit determines that the user has an intention to charge when at least all of following three conditions are fulfilled
   (i) when the getting-off determination unit determines that the user has gotten off the vehicle,
   (ii) when the stop position determination unit determines that the stop position of the vehicle is the predetermined position, and
   (iii) when the elapsed time determination unit determines that the elapsed time after the stopping of the vehicle is greater than the predetermined time length.

2. The vehicular charge control apparatus of claim 1 further comprising, a confirmation screen display unit that displays a confirmation screen for confirming that the user has the intention to charge when the stop position determination unit determines that the stop position of the vehicle is the predetermined position.

3. The vehicular charge control apparatus of claim 1, wherein
   the plug connection state determination unit is configured to repeatedly determine whether the charge plug is connected to the vehicle when the getting-off determination unit determines that the user has gotten off the vehicle, and
   the notification process execution unit is configured to repeatedly execute the notification process when the plug connection state determination unit determines that the charge plug is not connected.

4. The vehicular charge control apparatus of claim 1 further comprising a charge start time setting unit that sets a time to start charge of the vehicle as a reserved charge start time, wherein the charge intention determination unit is further configured to determine that the user has an intention to charge when the charge start time setting unit sets the reserved charge start time.

5. The vehicular charge control apparatus of claim 1 further comprising,
a charge start time setting unit that sets a time to start charge of the vehicle as a reserved charge start time,
the charge intention determination unit further determines that the user has an intention to charge when (i) the charge start time setting unit sets the reserved charge start time, and (ii) a current time is a predetermined time length before the reserved charge start time.

6. The vehicular charge control apparatus of claim 1 further comprising,
a determination start time setting unit that sets a time to a determination process by the charge intention determination unit as a determination process start time, wherein
the charge intention determination unit further determines that the user has an intention to charge when the determination start time setting unit sets the determination process start time.

7. The vehicular charge control apparatus of claim 1 further comprising
a determination start time setting unit that sets a time to a determination process by the charge intention determination unit as a determination process start time, wherein
the charge intention determination unit further determines that the user has an intention to charge when (i) the determination start time setting unit sets the determination process start time, and (ii) a current time is the determination process start time.

8. The vehicular charge control apparatus of claim 1, wherein
the plug connection state determination unit determines that the charge plug is not adequately connected when a power supply from the external power source is not confirmed.

9. The vehicular charge control apparatus of claim 1, wherein
the plug connection state determination unit performs the determination prior to a start of the charge operation.

10. The vehicular charge control apparatus of claim 1, wherein the elapsed time determination unit determines that the elapsed time after the stopping of the vehicle is greater than the predetermined time length only after the stopping of the vehicle and only after the getting-off determination unit determines that the user has gotten out of the vehicle.

11. The vehicular charge control apparatus of claim 10, wherein the stop position determination unit determines the stop position of the vehicle is the predetermined position only after the getting-off determination unit determines that the user has gotten out of the vehicle.

12. The vehicular charge control apparatus of claim 1, wherein the stop position determination unit determines the stop position of the vehicle is the predetermined position only after the getting-off determination unit determines that the user has gotten out of the vehicle.

13. A vehicular charge control system comprising:
a vehicular charge control apparatus that controls a charge operation of a vehicle from an external power source of the vehicle;
an information center that is communicably coupled with the vehicular charge control apparatus;
a getting-off determination unit that determines whether the user has gotten off the vehicle;
a stop position determination unit that determines that a stop position of the vehicle is a predetermined position; and
an elapsed time determination unit that determines whether an elapsed time after the stopping of the vehicle is greater than a predetermined time length, wherein
the vehicular charge control apparatus includes:
a charge intention determination unit that determines whether a user of the vehicle has an intention to charge;
a plug connection state determination unit that determines whether a charge plug is connected to the vehicle when the charge intention determination unit determines that the user has an intention to charge; and
a connection abnormality signal transmission unit that transmits a connection abnormality signal to the information center when the plug connection state determination unit determines that the plug is not connected,
the information center includes:
a connection abnormality signal reception unit that receives a connection abnormality signal; and
a notification process execution unit that executes a predetermined notification process when the connection abnormality signal reception unit receives the connection abnormality signal, and
the charge intention determination unit determines that the user has an intention to charge when all of following three conditions are fulfilled
(i) when the getting-off determination unit determines that the user has gotten off the vehicle,
(ii) when the stop position determination unit determines that the stop position of the vehicle is the predetermined position, and
(iii) when the elapsed time determination unit determines that the elapsed time after the stopping of the vehicle is greater than the predetermined time length.

14. The vehicular charge control apparatus of claim 13, wherein the elapsed time determination unit determines that the elapsed time after the stopping of the vehicle is greater than the predetermined time length only after the stopping of the vehicle and only after the getting-off determination unit determines that the user has gotten out of the vehicle.

15. The vehicular charge control apparatus of claim 14, wherein the stop position determination unit determines the stop position of the vehicle is the predetermined position only after the getting-off determination unit determines that the user has gotten out of the vehicle.

16. The vehicular charge control apparatus of claim 13, wherein the stop position determination unit determines the stop position of the vehicle is the predetermined position only after the getting-off determination unit determines that the user has gotten out of the vehicle.

* * * * *